(12) United States Patent
Veenstra et al.

(10) Patent No.: US 7,018,544 B2
(45) Date of Patent: Mar. 28, 2006

(54) FLUID TREATMENT DEVICE

(75) Inventors: Robert J. Veenstra, Thamesford (CA); Douglas G. Penhale, London (CA); Alan J. Royce, London (CA)

(73) Assignee: Trojan Technologies Inc. (CA)

( * ) Notice: Subject to any disclaimer, the term of this patent is extended or adjusted under 35 U.S.C. 154(b) by 162 days.

(21) Appl. No.: 10/374,766

(22) Filed: Feb. 27, 2003

(65) Prior Publication Data

US 2004/0026337 A1 Feb. 12, 2004

Related U.S. Application Data

(60) Provisional application No. 60/359,655, filed on Feb. 27, 2002.

(51) Int. Cl.
*C02F 1/30* (2006.01)

(52) U.S. Cl. .................. 210/748; 422/24; 422/186.3; 250/431; 250/436

(58) Field of Classification Search .................. 210/748, 210/153, 241; 422/24, 186.3; 250/431, 436
See application file for complete search history.

(56) References Cited

U.S. PATENT DOCUMENTS

| | | | | |
|---|---|---|---|---|
| 4,400,270 A | * | 8/1983 | Hillman | 210/103 |
| 5,037,618 A | | 8/1991 | Hager | |
| 5,352,359 A | * | 10/1994 | Nagai et al. | 210/192 |
| 5,471,063 A | * | 11/1995 | Hayes et al. | 250/436 |
| 5,504,335 A | * | 4/1996 | Maarschalkerweerd | 250/435 |
| 5,516,492 A | | 5/1996 | Dong et al. | |
| 5,545,335 A | | 8/1996 | Sween et al. | |
| 5,655,483 A | * | 8/1997 | Lewis et al. | 119/720 |
| 6,126,841 A | * | 10/2000 | Whitby et al. | 210/748 |
| 6,500,346 B1 | * | 12/2002 | Taghipour et al. | 210/748 |
| RE38,173 E | * | 7/2003 | Ishiyama | 250/431 |

* cited by examiner

*Primary Examiner*—Betsey Morrison Hoey
(74) *Attorney, Agent, or Firm*—Katten Muchin Rosenman LLP

(57) ABSTRACT

A fluid treatment device, preferably for the treatment of water, is described. The device comprises a closed housing having a fluid inlet, a fluid outlet and a fluid treatment zone disposed between the fluid inlet and the fluid outlet. The fluid treatment zone comprises a first irradiation zone and a second irradiation zone. At least one fluid mixing element is interposed between the first irradiation zone and the second irradiation zone.

41 Claims, 7 Drawing Sheets

FLUID TREATMENT DEVICE

CROSS-REFERENCE TO RELATED APPLICATION

The present application claims the benefit under 35 U.S.C. §119(e) of provisional patent application Ser. No. 60/359,655, filed Feb. 27, 2002, the contents of which are hereby incorporated by reference.

BACKGROUND OF THE INVENTION

1. Field of the Invention

In one of its aspects, the present invention relates to a fluid treatment system. In another of its aspects, the present invention relates to a method of treating fluid.

2. Description of the Prior Art

Fluid treatment devices and systems are known. For example, U.S. Pat. Nos. 4,482,809, 4,872,980, 5,006,244 and Re 36,896 (all assigned to the assignee of the present invention) all describe gravity fed fluid treatment systems which employ ultraviolet (UV) radiation to inactivate microorganisms present in the fluid.

The devices and systems described in the '809, '980 and '244 patents generally include several UV lamps each of which are mounted within sleeves extending between two support arms of the frames. The frames are immersed into the fluid to be treated which is then irradiated as required. The amount of radiation to which the fluid is exposed is determined by the proximity of the fluid to the lamps. One or more UV sensors may be employed to monitor the UV output of the lamps and the fluid level is typically controlled, to some extent, downstream of the treatment device by means of level gates or the like.

The system described in the '896 patent is a significant advance in the art in that it obviates a number of disadvantages deriving from the devices and systems '809, '980 and '244 patents. Unfortunately, the system described in the '896 patent is ideally suited for use in an open, channel-like system and is not readily adaptable to be used in a completely closed system where the flow of fluid is fed under pressure in a pipe.

Closed fluid treatment devices are known—see, for example, U.S. Pat. No. 5,504,335 (assigned to the assignee of the present invention). The '335 patent teaches a closed fluid treatment device comprising a housing for receiving a flow of fluid. The housing comprises a fluid inlet, a fluid outlet, a fluid treatment zone disposed between the fluid inlet and the fluid outlet, and at least one radiation source module disposed in the fluid treatment zone. The fluid inlet, the fluid outlet and the fluid treatment zone are in a collinear relationship with respect to one another. The at least one radiation source module comprises a radiation source sealably connected to a leg which is sealably mounted to the housing. The radiation source is disposed substantially parallel to the flow of fluid. The radiation source module is removable through an aperture provided in the housing intermediate to fluid inlet and the fluid outlet thereby obviating the need to physically remove the device for service of the radiation source.

While the closed fluid treatment device taught in the '335 patent (including the prior art device referred to in that patent) has been commercially successful to some degree, there is still room for improvement in the art.

Specifically, in many installations where it is desirable to treat large amounts of fluid (e.g., water), there is insufficient room to utilize a device such as that described in the '809, '980, '244 and '896 patents. Further, devices such as those taught in the '335 patent are constrained by the volume of fluid (e.g., water) which they can adequately treat (e.g., to subject the fluid to a radiation dose sufficient to perform the desired treatment).

Accordingly, there remains a need in the art for a fluid treatment system which combines the capacity of fluid volume treatment of the '809, '980, '244 and '896 patents while requiring a space of "foot print" not much larger than that used in the device taught by the '335 patent.

SUMMARY OF THE INVENTION

It is an object of the present invention to obviate or mitigate at least one of the above-mentioned disadvantages of the prior art.

Accordingly, in one of its aspects, the present invention provides a fluid treatment device comprising a closed housing having a fluid inlet, a fluid outlet, a fluid treatment zone disposed between fluid inlet and the fluid outlet, the fluid treatment zone comprising a first irradiation zone and a second irradiation zone, and at least one fluid mixing element interposed between the first irradiation zone and the second irradiation zone.

In another of its aspects, the present invention provides a method of treating fluid comprising the step of feeding fluid to be treated through the present fluid treatment device.

Thus, the present inventors have developed a fluid treatment system which is capable of treating large volumes of fluid (e.g., water) while requiring a relatively small foot print. In essence, the present fluid treatment system concentrates a relatively large number of radiation sources in a relatively small amount of space resulting in the ability to treat large volumes of fluid (e.g., water).

While the present invention relates to fluid treatment devices generally, the most preferred application of the system is in treating liquids such as water (e.g., municipal waste water, drinking water, contaminated ground water and the like). However, those with skill in the art will recognize that the present fluid treatment system will also find utility in treating other types of fluids such as gases and the like.

The currently preferred embodiment of the present fluid treatment system comprises a stacked arrangement of interconnected fluid treatment subsystems or reactors. While the number of reactors is not specifically restricted, in a preferred embodiment, there are three reactors arranged in a stack. With this preferred arrangement, it is possible to implement an overall treatment system which comprises a plurality of interconnected such stacks, thereby providing a large number of radiation sources in a relatively small footprint inclusive of all hardware (including virtually all hardware for the system such as reactors, ballasts, control systems and the like).

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
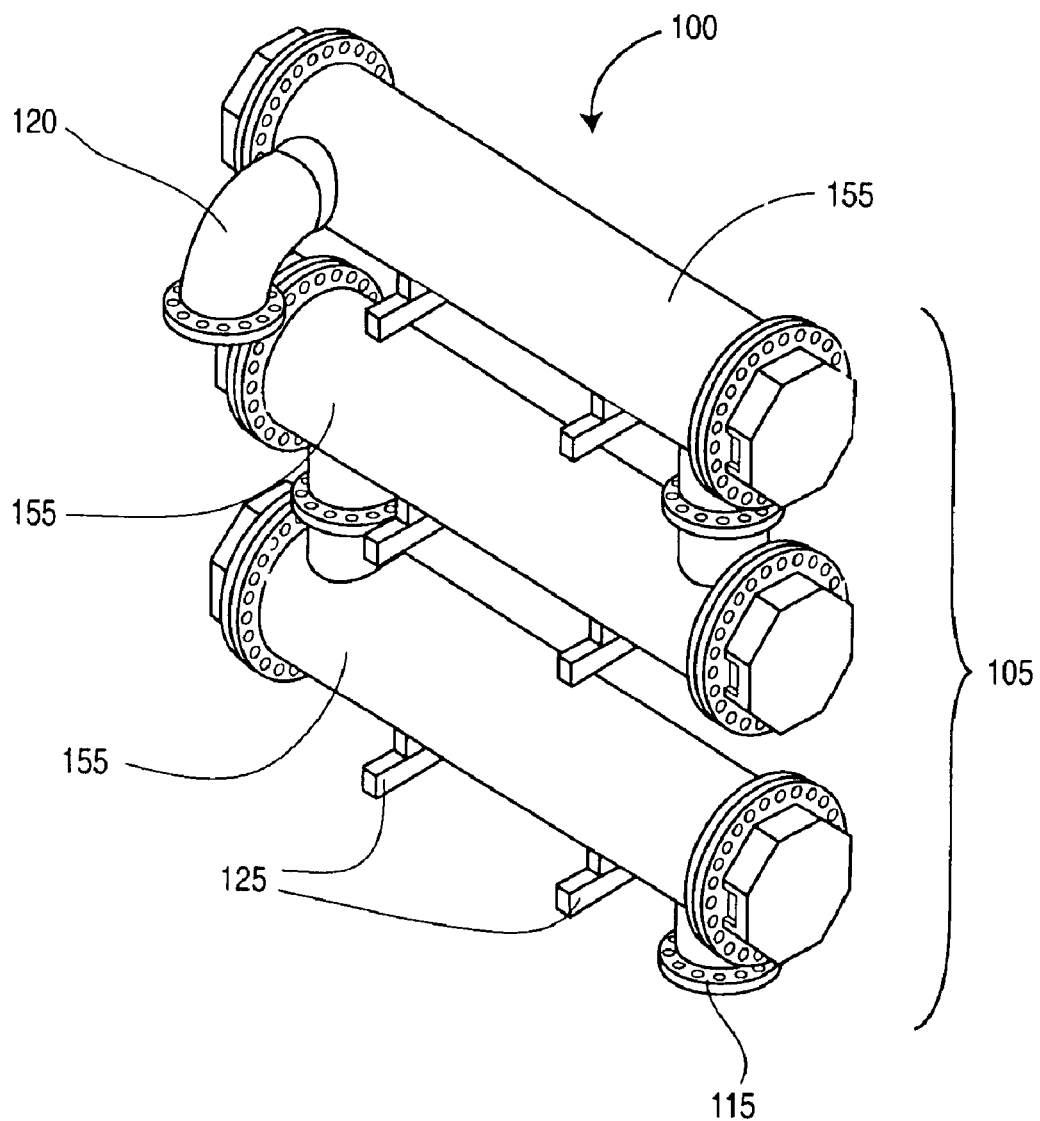
FIG. 1 illustrates a perspective view of a preferred embodiment of the present fluid treatment system.
Figure 2:
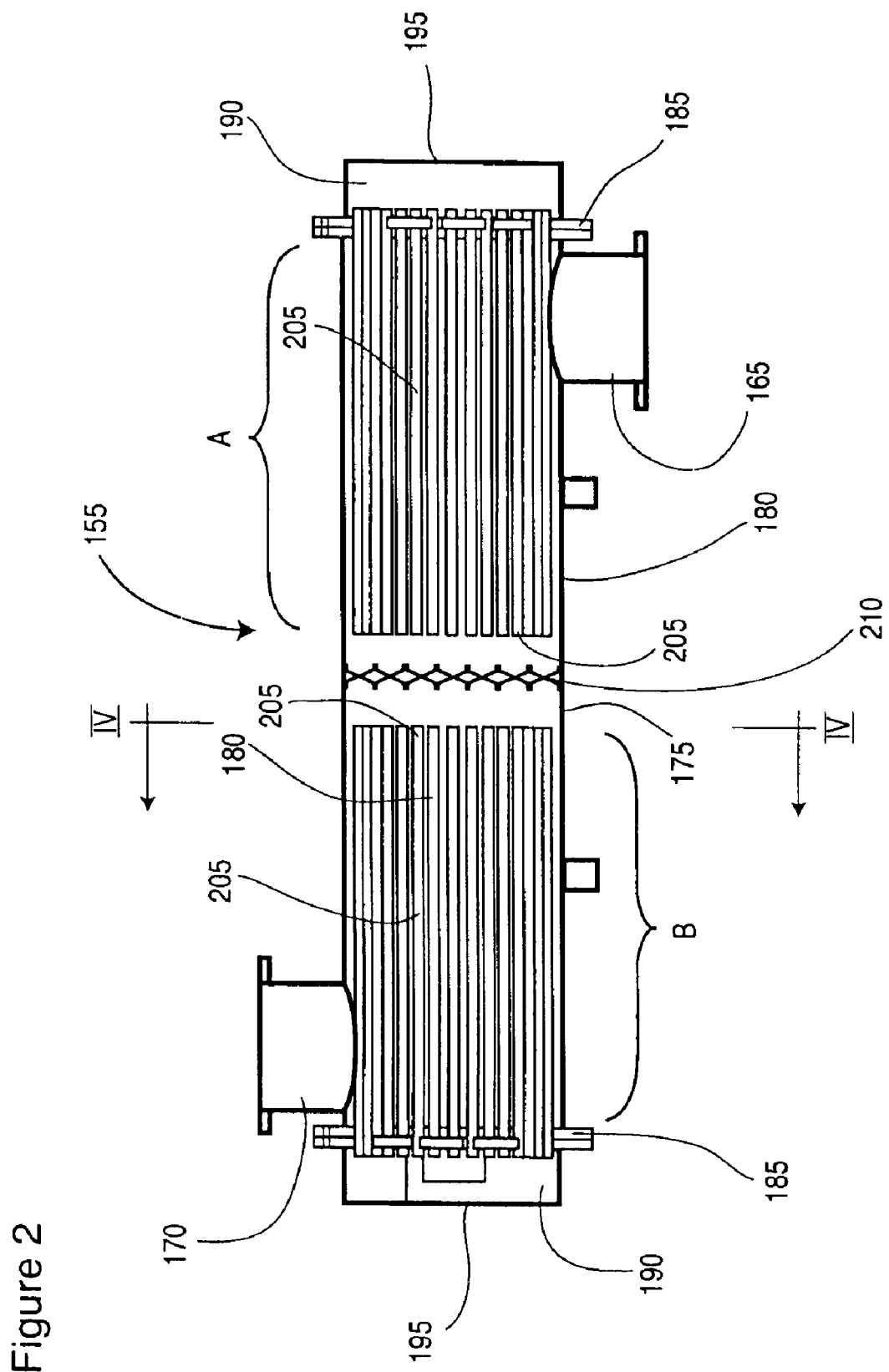
FIG. 2 illustrates a side elevation, in cross-section of a preferred embodiment of the present fluid treatment device.
Figure 3:
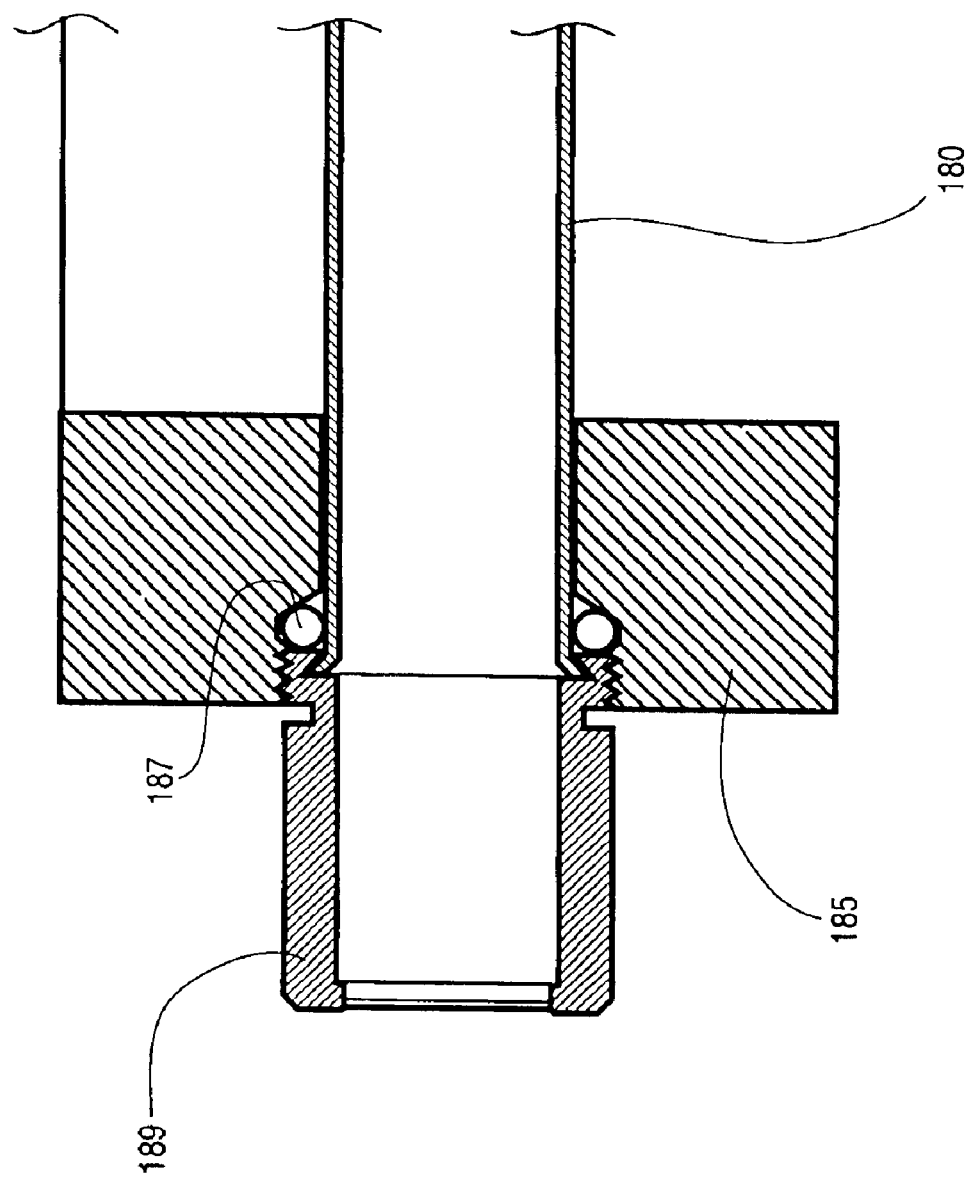
FIG. 3 illustrates a preferred embodiment for sealing a protective sleeve with respect to the housing in which fluid is being treated.
Figure 4:
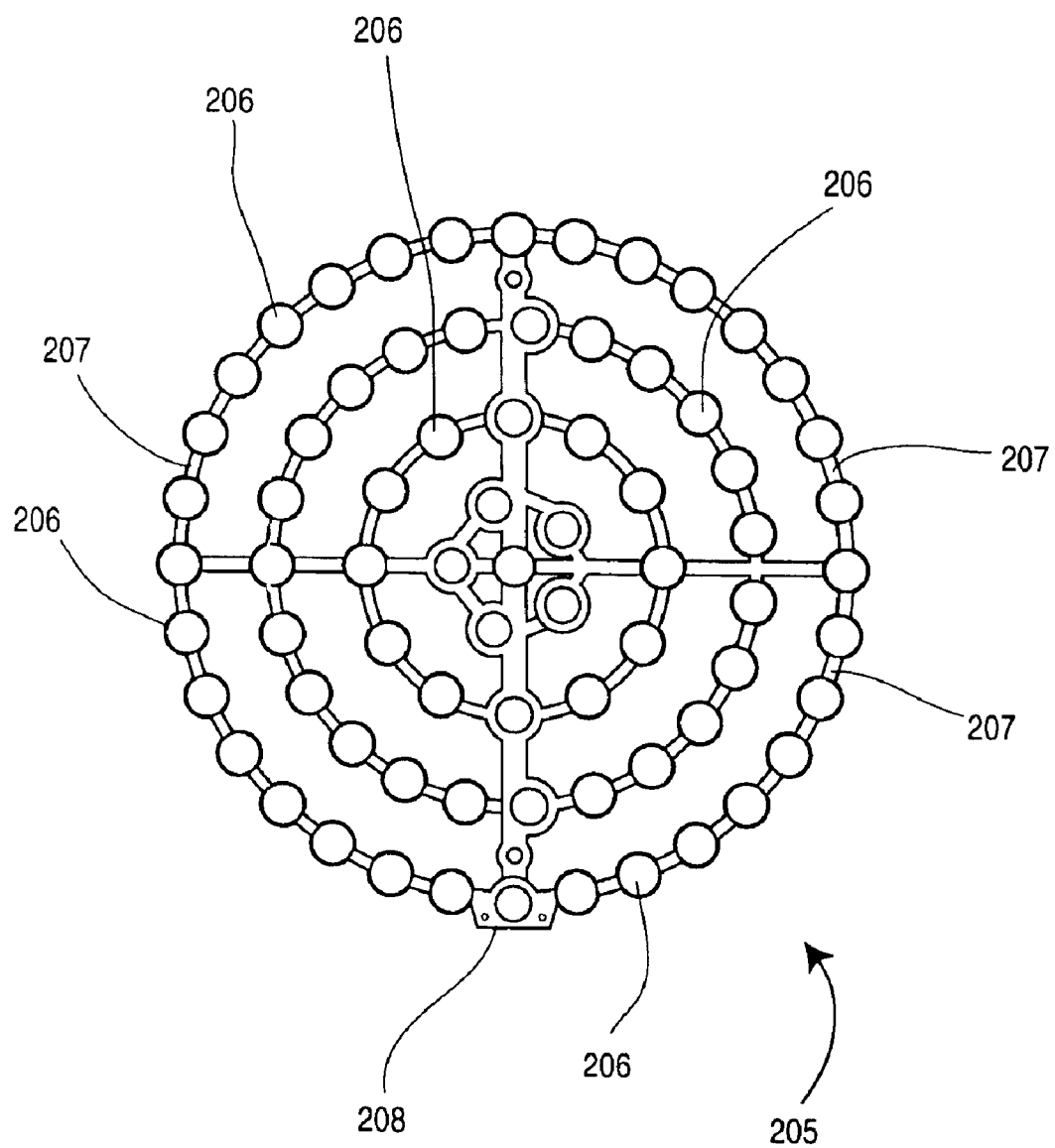
FIG. 4 illustrates a section along line IV—IV in FIG. 2.
Figure 5:
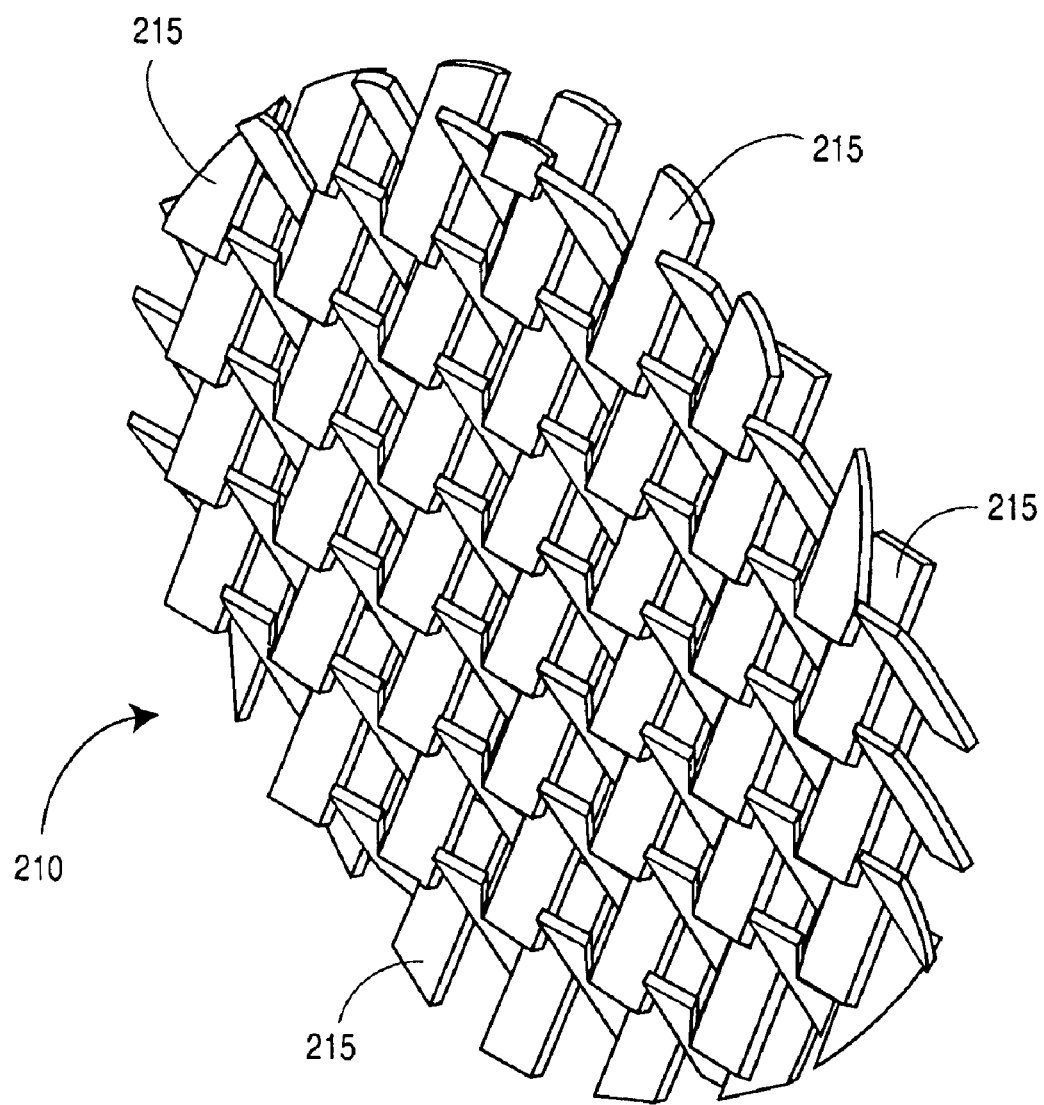
FIG. 5 illustrates a perspective view of a preferred mixing element for use in the present fluid treatment device.

Thus, with reference to FIGS. 1–5, there is illustrated a fluid treatment system 100. Fluid treatment system 100 comprises a fluid treatment system reactor array 105 and a control panel (not shown) which is remote from fluid treatment reactor array 105.

Fluid treatment reactor array 105 comprises an array inlet 115 and an array outlet 120. Fluid treatment reactor array 105 further comprises a pair of supports 125.

Fluid treatment array 105 comprises a trio of radiation reactors 155. Generally, each radiation reactor 155 comprises a reactor inlet 165 and a reactor outlet 170. Reactor inlet 165 and reactor outlet 170 are interconnected by a substantially tubular housing 175. Disposed within tubular housing 175 is a first irradiation zone A and a second fluid irradiation zone B.

Each of irradiation zone A and irradiation zone B comprises a series of elongate tubes 180. Tubes 180 are made from a radiation transparent material such as, for example, quartz.

As illustrated, one end of each tube 180 is closed while the other end is sealingly engaged to a plate 185 via an O-ring 187 and a sleeve cap 189. As will be appreciated by those of skill in the art, the precise manner of achieving engagement between tubes 180 and plate 185 is conventional, and is within the purview of a person skilled in the art. Disposed within each tube 180 is a radiation source (not shown for clarity). Preferably, the radiation source is an ultraviolet radiation source. The nature of the ultraviolet radiation source is not particularly restricted. In one embodiment, the ultraviolet radiation source may be a low-pressure ultraviolet radiation lamp. In another embodiment, the ultraviolet radiation source may be a medium-pressure ultraviolet radiation lamp. In yet another embodiment, the radiation source may be a low-pressure amalgam lamp. Such lamps are commercially available and are known in the art. As is known in the art, the radiation source typically comprises electrical leads (again not shown for clarity) which, in this case, would emanate from the open end of tubes 180 to a supplementary housing 190 defined by an end cap 195 engaged to plate 185.

Disposed within tubular housing 175 is a support plate 205 which serves to support tubes 180 at an intermediate region thereof and a distal region thereof. Support plate 205 provides a plurality of annular elements 206 which are interconnected by a series of connecting elements 207. Support plate 205 comprises a base section 208 which is supported by a surface of tubular housing 175. As will be appreciated by those of skill in the art, annular elements 206 of support plate 205 are arranged in a manner that accords with the physical arrangement of the array of tubes 180 in each irradiation zone A and irradiation zone B. Thus, other arrangements of annular elements 206 are possible.

Interposed between the irradiation zone A and irradiation zone B is a fluid mixing device 210 which comprises a plurality of interconnected vanes 215. Fluid mixing device 210 may be secured to the inner surface of tubular housing 175 and/or to either or both of the distal ends of irradiation zone A and irradiation zone B disposed therein.

Preferably, also disposed within tubular housing 175 is a cleaning system for periodically removing fouling materials from the surface of tubes 180. The design and operation of the cleaning system is not particularly restricted. For example, see U.S. patent application Ser. No. 10/247,317 (filed Sep. 20, 2002 in the name of Williamson et al.). Of course, other cleaning systems such as a chemical-mechanical cleaning system may be used (e.g., similar in design and operations of that described in the '896 patent referred to above).

Figure 7:
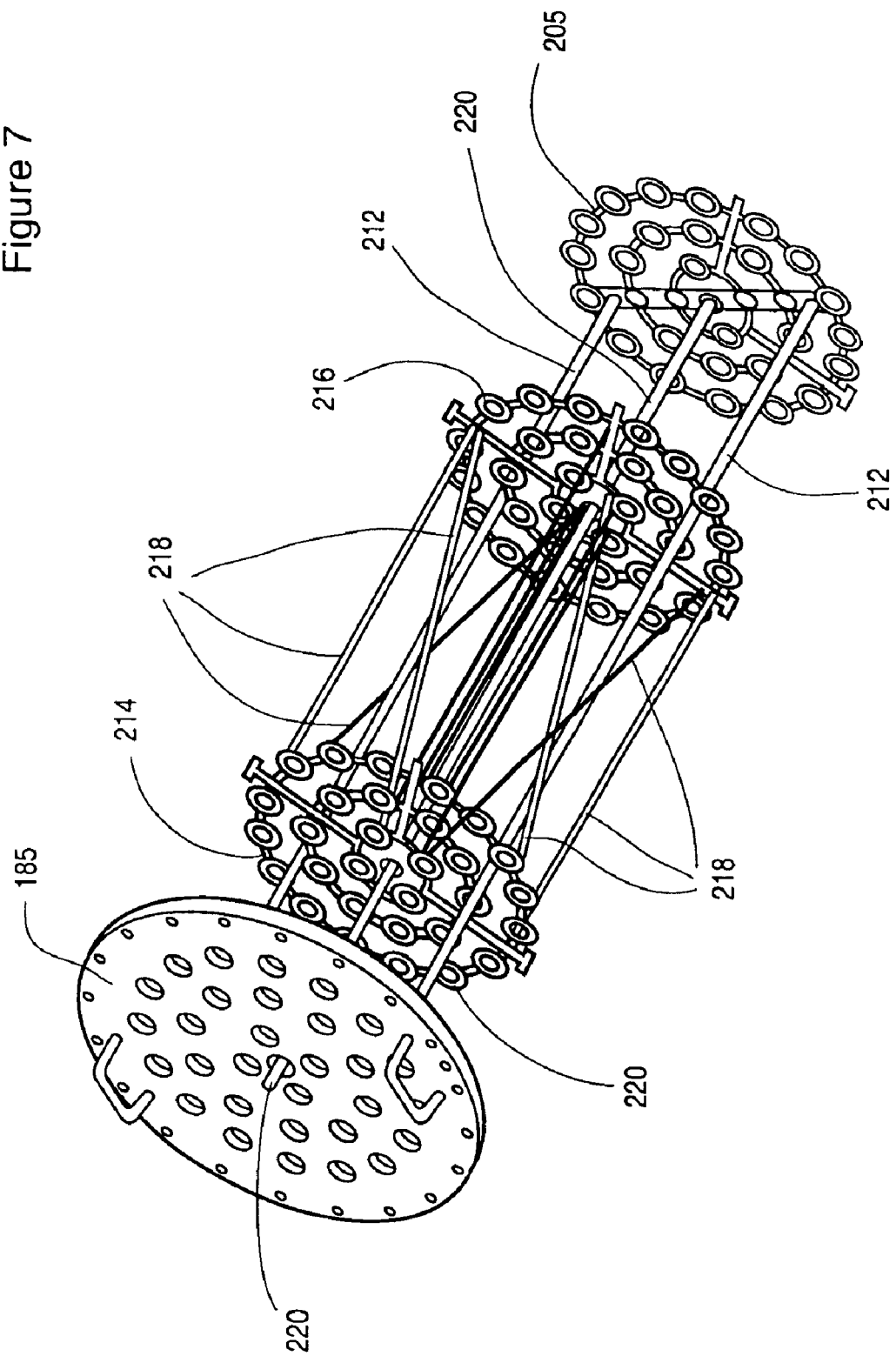
FIG. 7 illustrates a perspective view of a portion of the embodiment of the present fluid treatment device illustrated in FIG. 2 which has been modified to include a preferred cleaning device.

A preferred cleaning system is illustrated in FIG. 7 which illustrates selected internal components of irradiation zone A or irradiation zone B. Thus, plate 185 and support plate 205 are provided and are similar to those elements illustrated in FIGS. 2–4. Plate 185 and support plate 205 are interconnected by first tie rods 212. Interposed between plate 185 and support plate 205 are two cleaning plates 214,216. In the illustrated embodiment, cleaning plates 214,216 are interconnected by a series of second tie rods 218. As shown, some of tie rods 218 are parallel to tie rods 212 and some of tie rods 218 are angled with respect to tie rods 212. The precise number of tie rods 218 and their specific disposition with respect to tie rods 212 will vary depending on the number of tubes 180 used in irradiation zone A and/or irradiation zone B. The basic purpose of tie rods 218 is to secure cleaning plates 214,216 with respect to one another and to obviate or mitigate jamming of cleaning plates 214,216 as they are moved over tubes 180 (not shown in FIG. 7 for ease of understanding). A screw 220 passes through plate 185 and is in threaded engagement with cleaning plates 214,216. The proximal end of screw 220 is connected to a reversible screw drive (not shown) of conventional choice. The number of elongated tubes 180 disposed within tubular housing 175 is not particularly restricted. For example, the number of tubes (and thus the number of radiation sources or lamps) disposed within each reactor 155 may be up to 70 or more. Thus, the combination of the cleaning plates 214,216 and tie rods 218 may be regarded as a cleaning carriage which may be reversibly moved between plate 185 and support plate 205.

When it is desired to clean the exterior of tubes 180 (not shown in FIG. 7), the screw drive is engaged thereby rotating screw 220 a first direction. This, results in translation of the combination of cleaning plates 214,216 and tie rods 218. If desired, the screw drive may be reversed thereby rotating screw 220 in a second direction opposite to the first direction. Preferably, the "parked" position of the illustrated cleaning system is that wherein cleaning plate 214 is adjacent to plate 185. This will allow cleaning plate 216 to function as a supplementary support for tubes 180 (not shown in FIG. 7) when the cleaning system is in the "parked" position.

The operation of fluid treatment system 100 will now be described with reference to a specific reactor 155.

Water (or any other fluid) which is in need of disinfection or otherwise in need of treatment enters reactor 155 at reactor inlet 165 wherein it passes through irradiation zone A and is exposed to a predetermined amount of radiation (the amount of radiation needed may be determined and controlled in a conventional manner). Thereafter, the water is passed through mixing device 210 which serves to obviate or mitigate short circuiting of the water through the remainder of reactor 155. As is known in the art, short circuiting occurs when water tends to pass along the outside of the reactor array. Thus, mixing device 210 serves to create one or more of turbulence, vortices and the like which serves to regularize the flow of water through substantially the entire cross-section of housing 175 downstream of mixing element 210. This improves the effectiveness of irradiation zone B which may deliver the same or a different amount of radiation to the fluid being treated as what was given to irradiation zone A. Thereafter, the water exists reactor 155 via a rector outlet 170.

A distinct advantage of reactor 155 is that, the combination of two irradiation zones having interposed therebetween a mixing element results in highly efficient treatment of fluid passing through the reactor. Further, by arranging the reactors in a trio (FIG. 1) or other series, a relatively large number of lamps can be placed in a small footprint thereby reducing the amount of space needed for treatment of large volumes of fluid, particularly fluid having relatively high levels of contaminents.

Figure 6:
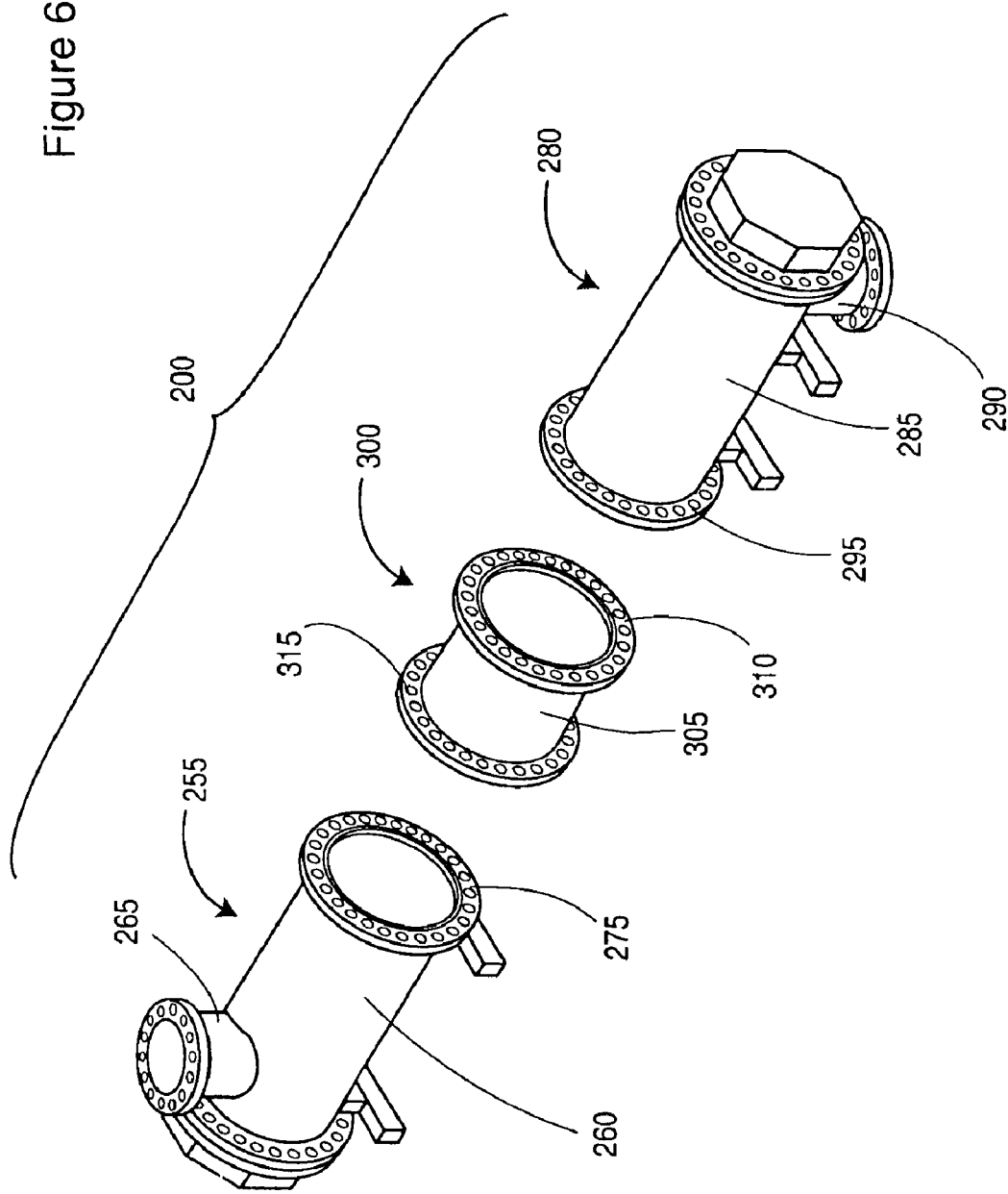
FIG. 6 illustrates a perspective view of a preferred modular component for use in the present fluid treatment device.

With reference to FIG. 6, an alternate embodiment of the present reactor is illustrated, namely reactor 200. Thus, FIG. 6 illustrates a perspective view of a first portion 255 of reactor. First portion 255 comprises an elongate sub-housing 260 and a flange 275. Disposed within sub-housing 260 is a series of tubes (not shown for clarity) similar in design to tubes 180 described above. Disposed at one end of sub-housing 260 is a port 265 which may operate as one of an inlet or an outlet depending on the direction of fluid flow through sub-housing 260. FIG. 6 further illustrates a perspective view of a second portion 280 of reactor 200. Second portion 280 comprises an elongate sub-housing 285 and a flange 295. Disposed within sub-housing 285 is a series of tubes (not shown for clarity) similar in design to tubes 180 described above. Disposed at one end of sub-housing 285 is a port 290 which may operate as the other of the inlet or the outlet depending on the function of port 265 of first portion 255. Interposed between first portion 255 and second portion 280 is a connecting portion 300 which comprising a sub-housing 305 disposed between a first flange 310 and a second flange 315. As will be appreciated by those of skill in the art, reactor 200 may be assembled by connecting, in a fluid tight manner, flange 275 to flange 315 and flange 310 to flange 295 to form an overall reactor which operates in a manner similar to the one described with reference to FIGS. 1–5. The mixing element (not shown for clarity) may be disposed within any one (or more) of first portion 255, second portion 280 and connecting portion 300. Further, if the mixing element is disposed in one or more of first portion 255 and second portion 280, it is possible to omit connecting portion 300. Thus, it is possible, in some cases, to utilize a connecting portion with or without the mixing device attached thereto.

Reactor 200 may be operated in a manner similar to that described above with reference to FIGS. 1–5.

While a specific mixing element 210 has been illustrated with reference to FIGS. 1–5, those will skill in the art will recognize that the specific design and nature of the mixing element is not particularly restricted. For example, mixing element 210 may be modified or substituted to provide an alternate mixing technique, such as described in any of the following prior art references:

U.S. Pat. No. 4,929,088 [Smith],
U.S. Pat. No. 4,981,361 [Smith],
U.S. Pat. No. 5,696,380 [Cooke],
U.S. Pat. No. 5,800,059 [Cooke],
U.S. Pat. No. 5,803,602 [Eroglu]
U.S. Pat. No. 5,813,762 [Fleischli]
U.S. Pat. No. 5,866,910 [Cooke],
U.S. Pat. No. 5,994,705 [Cooke],
U.S. Pat. No. 6,000,841 [Cooke], and
U.S. Pat. No. 6,015,229 [Cormack et al.].

It will be apparent to those of skill in the art that variations to the specific design shown in FIGS. 1–7 can be made without departing from the spirit and scope of the present invention. For example, the diameter of tubular housing 175 is not particularly restricted. Preferred diameters are within the range from about 6 inches to about 30 inches (particularly preferred diameters are 8 inches, 12 inches, 16 inches, 20 inches, 24 inches and 30 inches).

In the illustrated embodiment, reactor inlet 165 and reactor outlet 170 to each reactor 155 are oriented such that the direction of fluid flow through each is substantially transverse to the longitudinal axis of housing 175. While this is a highly preferred orientation of reactor inlet 165 and reactor outlet 170 in relation to the direction of fluid flow and longitudinal axis of elongate tubes 180, it is possible to modify these specific features of reactor 155.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, cleaning plates 214,216 in FIG. 7 function as a series of so-called mechanical cleaning devices. It is of course possible to alter the specific mode of cleaning to include combined chemical/mechanical cleaning or other forms of mechanical cleaning Also, the screw drive used for the cleaning device in FIG. 7 may be replaced with another motive system such as a magnetically coupled rodless drive (see, for example, U.S. Pat. No. 6,342,188 [Pearcey et al]). Further, while the cleaning device illustrated in FIG. 7 utilizes a pair of cleaning plates, depending on the size of the irradiation zone and the number of tubes 180, it is possible to utilize a single cleaning plate or three or more cleaning plates. Again, depending on the size of the irradiation zone and the number of tubes 180, it may not be desirable to interconnect the cleaning plates. Still further, it is possible to modify cleaning plates 214,216 to include a mixing element such as the ones described above. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid treatment device comprising:
    a closed housing having a fluid inlet,
    a fluid outlet,
    a fluid treatment zone disposed between the fluid inlet and the fluid outlet, the fluid treatment zone comprising a first irradiation zone comprising a first plurality of elongate radiation sources and a second irradiation zone downstream of the first irradiation zone and comprising a second plurality of elongate radiation sources independent of the first plurality of elongate radiation sources, and
    at least one non-annular fluid mixing element interposed between the first irradiation zone and the second irradiation zone;

wherein each of the first plurality of elongate radiation sources and the second plurality of elongate radiation sources has a longitudinal axis disposed substantially parallel to a direction of fluid flow through the housing.

2. The fluid treatment device defined in claim 1, wherein the closed housing is elongate and has a housing longitudinal axis substantially parallel to a direction of fluid flow therethrough.

3. The fluid treatment device defined in claim 2, wherein the fluid inlet is oriented such that a direction of fluid flow therethrough is transverse to the housing longitudinal axis.

4. The fluid treatment device defined in claim 2, wherein the fluid outlet is oriented such that a direction of fluid flow therethrough is transverse to the housing longitudinal axis.

5. The fluid treatment device defined in claim 2, wherein each of the fluid inlet and the fluid outlet is oriented such that a direction of fluid flow therethrough is transverse to the housing longitudinal axis.

6. The fluid treatment device defined in claim 1, wherein the mixing element is secured to at least tow of: (i) a surface of the housing, (ii) a surface of the first irradiation zone, and (iii) a surface of the second irradiation zone.

7. The fluid treatment device defined in claim 1, wherein the mixing element is secured to each of a surface of: (i) the housing, (ii) a surface of the first irradiation zone, and (iii) a surface of the second irradiation zone.

8. The fluid treatment device defined in claim 1, wherein the fluid inlet, the fluid outlet, and the remainder of the housing comprise a single integral unit.

9. The fluid treatment device defined in claim 1, wherein each radiation source comprises an ultraviolet radiation source.

10. The fluid treatment device defined in claim 1, wherein each radiation source comprises a low pressure ultraviolet radiation source.

11. The fluid treatment device defined in claim 1, wherein each radiation source comprise a medium pressure ultraviolet radiation source.

12. The fluid treatment device defined in claim 1, wherein each radiation source is disposed in a quartz protective sleeve.

13. The fluid treatment device defined in claim 1, wherein each radiation source is disposed in a protective sleeve.

14. The fluid treatment device defined in claim 13, wherein a first proximal end of each protective sleeve emanates from the housing in a substantially fluid tight manner.

15. The fluid treatment device is defined in claim 14, wherein each protective sleeve comprises a closed distal end.

16. The fluid treatment device is defined in claim 14, further comprising at least one support for supporting a portion of each protective sleeve first proximal end.

17. The fluid treatment device defined in claim 16, wherein the support comprises a plurality of interconnected annular elements, each annular element receiving a protective sleeve.

18. The fluid treatment device defined in claim 1, wherein the mixing element is secured to both of the first irradiation zone an the second irradiation zone.

19. The fluid treatment device defined in claim 1, wherein the mixing element is secured to at least one of the first irradiation zone and the second irradiation zone.

20. The fluid treatment device defined in claim 1, further comprising a cleaning system to remove undesirable materials from radiation sources disposed in the at least one of the first irradiation zone and the second irradiation zone.

21. The fluid treatment device defined in claim 20, wherein the cleaning system comprises plurality of interconnected annular cleaning elements.

22. The fluid treatment device defined claim 21, wherein the cleaning system comprises at least one mixing element to cause mixing of fluid passing by the cleaning system.

23. The fluid treatment device defined in claim 21, wherein each annular cleaning element is configured to receive a protective sleeve.

24. The fluid treatment device defined in claim 21, wherein each of the annular cleaning elements comprises a scraping element for mechanical removal of undesirable materials from the radiation sources. plurality of mixing vanes are interconnected.

25. A fluid treatment device comprising:
a closed housing having a fluid inlet,
a fluid outlet,
a fluid treatment zone disposed between the fluid inlet and the fluid outlet, the fluid treatment zone comprising a first irradiation zone and a second irradiation zone, and
at least one fluid mixing element interposed between the first irradiation zone and the second irradiation zone, wherein the mixing element is secured to a surface of the housing.

26. A fluid treatment device comprising:
a closed housing having a fluid inlet,
a fluid outlet,
a fluid treatment zone disposed between the fluid inlet and the fluid outlet, the fluid treatment zone comprising a first irradiation zone and a second irradiation zone, and
at least one fluid mixing element interposed between the first irradiation zone and the second irradiation zone, wherein the fluid inlet, the fluid outlet, and the remainder of the housing comprise a plurality of independent units which are engaged in substantially fluid tight manner.

27. A fluid treatment device comprising:
a closed housing having a fluid inlet,
a fluid outlet,
a fluid treatment zone disposed between fluid inlet and the fluid outlet, the fluid treatment zone comprising a first irradiation zone and a second irradiation zone, and
at least one fluid mixing element interposed between the first irradiation zone and the second irradiation zone;
wherein the fluid inlet and a first portion of the housing form a first integral unit, and wherein the fluid outlet and a second portion of the housing form a second integral unit, the first integral unit and the second integral unit being interconnecting in a substantially fluid tight manner.

28. The fluid treatment device defined in claim 27, wherein the first integral unit and the second integral unit are directly interconnected.

29. The fluid treatment device defined in claim 27, wherein the first integral unit and the second integral unit are indirectly interconnected through a connection unit which is connected to each of the first integral unit and the second integral unit in a substantially fluid tight manner.

30. The fluid treatment device defined in claim 29, wherein the at least one mixing element is attached to the connection unit.

31. A fluid treatment device comprising:
a closed housing having a fluid inlet,
a fluid outlet, a fluid treatment zone disposed between the fluid inlet and the fluid outlet, the fluid treatment zone comprising a first irradiation zone and second irradiation zone, and at least one fluid mixing element interposed between the first irradiation zone and the second irradiation zone, wherein the fluid mixing element comprises a plurality of mixing vanes, each vane angularly oriented with respect to a direction of fluid flow through the housing.

32. The fluid treatment device defined in claim 31, wherein the plurality of mixing vanes are interconnected.

33. A fluid treatment system comprising at least one fluid treatment device comprising:

a closed housing having a fluid inlet, a fluid outlet, a fluid treatment zone disposed between the fluid inlet and the fluid outlet, the fluid treatment zone comprising (i) a first irradiation zone having a first radiation source and (ii) a second irradiation zone having a second radiation source, and at least one fluid mixing element interposed between the first irradiation zone and the second irradiation zone, said fluid mixing element including fluid mixing structure which is not in contact with either the first radiation source or the second radiation source.

34. A fluid treatment system comprising at least one fluid treatment device comprising:

a closed housing having a fluid inlet, a fluid outlet, a fluid treatment zone disposed between the fluid inlet and the fluid outlet, the fluid treatment zone comprising (i) a first irradiation zone having a first radiation source and (ii) a second irradiation zone having a second radiation source, and at least one mixing element interposed between the first irradiation zone and the second irradiation zone, said fluid mixing element including fluid mixing structure which is not in contact with either the first radiation source or the second radiation source.

35. A fluid treatment system according to claim 34, wherein said plurality of fluid treatment devices comprises three fluid treatment devices defined in claim 1.

36. The fluid treatment system defined in claim 34, wherein the fluid treatment devices are interconnected.

37. The fluid treatment system defined in claim 36, wherein a fluid outlet of one fluid treatment device is connected to fluid inlet of another fluid treatment device.

38. A method of treating fluid comprising the steps of:

providing a fluid treatment device in a fluid treatment zone, the fluid treatment device comprising (i) a closed housing having a fluid inlet, and (ii) a fluid outlet, providing the fluid treatment zone between the fluid inlet and the fluid outlet, the fluid treatment zone comprising a first irradiation zone and second irradiation zone;

providing at least one or more elongate radiation sources each having a longitudinal axis disposed substantially parallel to a direction of fluid flow through the treatment device;

providing ate least one non-annular fluid mixing element interposed between the first irradiation zone and the second irradiation zone; and feeding fluid to be treated through the fluid treatment device.

39. The method defined in claim 38, wherein the fluid comprises a liquid.

40. The method defined in claim 38, wherein the fluid comprises water.

41. A method of treating fluid according to claim 38, wherein the three providing steps provide a plurality of fluid treatments devices, and wherein the feeding fluid step comprises the step of feeding the fluid to be treated through the plurality of fluid treatment devices.

\* \* \* \* \*